Patented Feb. 28, 1933

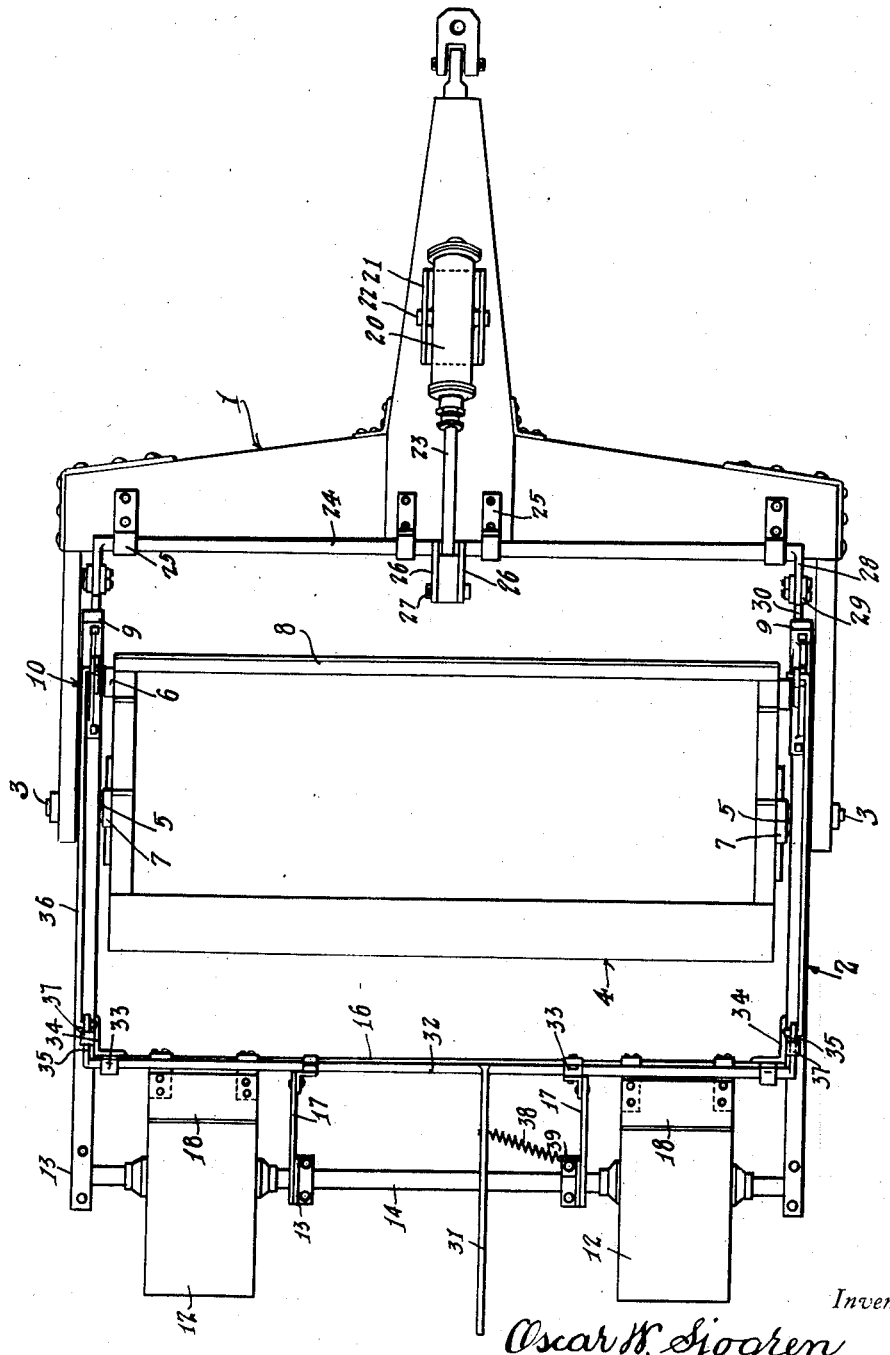

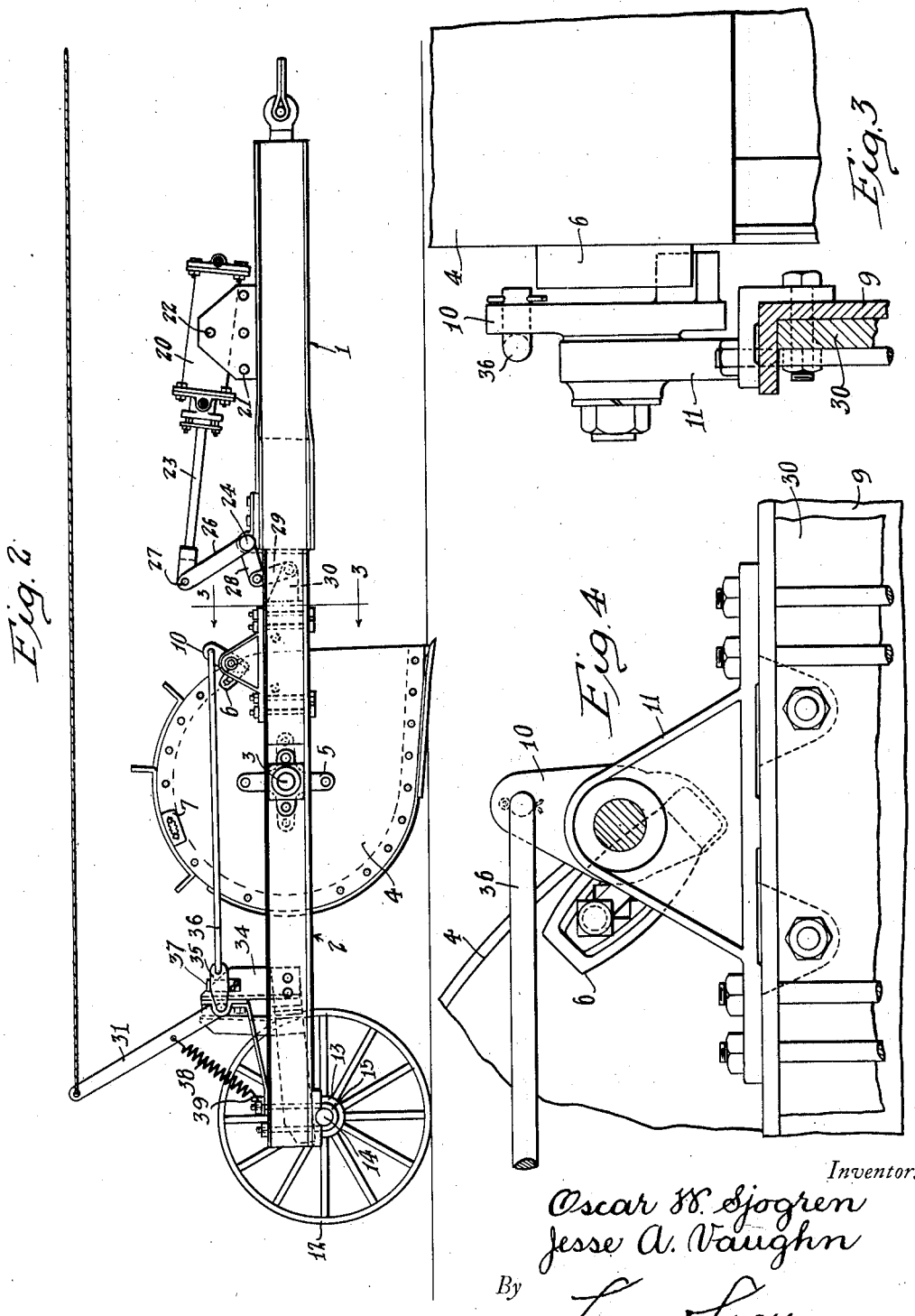

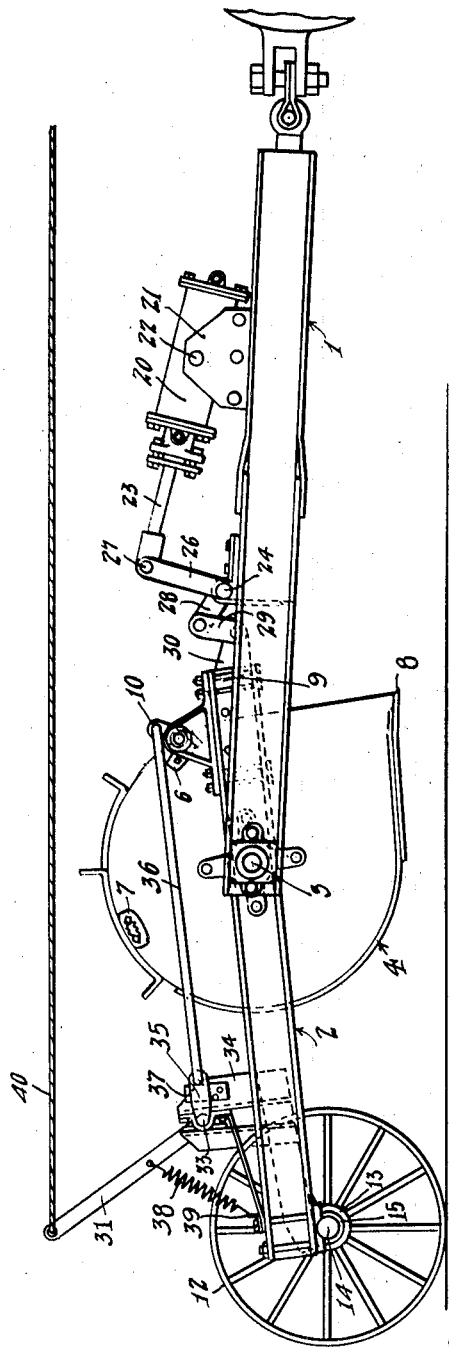

1,899,118

UNITED STATES PATENT OFFICE

OSCAR W. SJOGREN, OF HUNTINGTON PARK, AND JESSE A. VAUGHN, OF LOS ANGELES, CALIFORNIA, ASSIGNORS TO KILLEFER MANUFACTURING CORPORATION, LTD., OF LOS ANGELES, CALIFORNIA, A CORPORATION OF CALIFORNIA

HYDRAULIC WHEEL SCRAPER

Application filed July 18, 1932. Serial No. 623,122.

This invention relates to a hydraulic wheel scraper, in which the scraper bowl is elevated by a hydraulically actuated mechanism, which mechanism operates to simultaneously rotate the bowl in a counterclockwise direction (as viewed in Figs. 2 and 5) while elevating the bowl from a scraping to a carrying position whereby the accumulated load will be retained within the bowl and the cutting edge thereof tilted to a non-cutting position.

In the ordinary scraper, when the loaded bowl is elevated to a carrying position, much of the accumulated load spills out, thus greatly reducing the load-carrying ability of the bowl, and thus the efficiency of the scraper.

It is an object of this invention to provide the scraper with an elevating mechanism which will simultaneously rotate the bowl in a counter-clockwise direction, as viewed in Figs. 2 and 5, during the lifting operation so as to effectively retain the accumulated load within the scraper bowl, and to thus prevent spilling of the load and to thereby materially increase the carrying efficiency of the scraper.

The ordinary scraper has another serious defect, namely, wherein the cutting blade of the scraper bowl is not angled to a non-cutting position during the elevating of the bowl. In other words, the cutting blade is left in the cutting position whether the bowl is in the loading or the carrying position.

One of the many uses of a scraper is for the building up of levees or embankments, but with the ordinary scraper it is practically impossible to build a levee or embankment as such a scraper will not ride up onto or over the levee but instead will cut its way through the levee as the cutting blade has not been tilted out of cutting angle.

A further object is to provide a control mechanism which will, while elevating the bowl, simultaneously tilt or rotate the cutting blade out of cutting angle so that when the scraper is drawn over a levee, the scraper blade will not cut into or through the levee but will ride or float over such a levee or embankment.

Other objects and advantages of the invention will become apparent as the nature of the same is more fully understood from the following description and drawings, wherein is set forth what is now considered to be a preferred embodiment. It should be understood, however, that this particular embodiment of the invention is chosen principally for the purpose of exemplification and that variations therefrom in details of construction or arrangement of the parts may accordingly be effected and yet remain within the spirit and scope of the invention as the same is set forth in the appended claims.

In the drawings:

Figure 1 illustrates a plan view of the invention.

Figure 2 is a side elevation of Figure 1 and illustrates the invention in the loading position.

Figure 3 is an enlarged fragmental sectional view, taken substantially along line 3—3 of Figure 2.

Figure 4 is a fragmental side elevation of Figure 3.

Figure 5 is a view similar to Figure 2, excepting that the implement is illustrated in its carrying position.

A preferred construction of our invention, disclosed in the drawings, includes a front frame 1 and a rear frame 2 pivotally connected as at 3. A scraper bowl 4 is provided at each end with trunnions 5 for pivotally mounting the bowl at the pivotal connecting point 3 of the front and rear frames. The scraper bowl is provided with a cutting blade 8 and also at each end with an adjustable loading stop 6 and an adjustable spreading stop 7, and in other respects the bowl is of the ordinary construction.

Upon each of the front ends 9 of the rear frame there is operatively mounted a self-releasing swinging latch means 10 positioned to be engaged by either of the bowl stops 6 or 7. The latch means 10 are journaled in bearings 11 and are so arranged that unless locked against rotation, will be swung out of engagement with the bowl stops by the thrust of the bowl stops thereagainst, thus forming a self-releasing latching means. Means, later to be described, are provided for retaining the latch means in locking engagement with the bowl stops to retain the bowl in either the scraping, carrying or the spreading positions.

To the rear end of rear frame 2 are journaled the traction wheels 12 by any suitable means, such as bearings 13 and shaft 14, which bearings may be suitably mounted upon the frame by the U-bolts 15. The rear frame may also be provided with the brace member 16, which in turn carries the brace members 17 for stiffening the axle 14. Wheel cleaners 18 may be suitably mounted upon the brace member 16 for cleaning the wheels of mud or other deleterious matter.

Means are provided for articulating frames 1 and 2 about their pivotal connection 3, whereby the scraper bowl may be elevated from the scraping position to the carrying position (note Figs. 2 and 5) or lowered into scraping position from the carrying position, which means may include the hydraulic cylinder 20 pivotally mounted upon the front frame as by standard 21 and trunnions 22 and having a piston rod 23. A rock shaft 24 is journaled upon the front frame by means of bearings 25 and is provided intermediate of its ends with spaced lever arms 26 to the upper end of which is pivotally connected one end of the piston rod 23 as by the pivot pin 27. A lifting arm 28 is provided at each end of the rock shaft 24 and is operatively connected to the adjacent front end 9 of the rear frame by means of links 29 and the brackets 30.

The scraper is adapted to be drawn by an ordinary tractor, which is equipped with the usual oil pump and control valve mechanism (all of which have not been shown) for supplying impulses of pressure fluid to the hydraulic cylinder for operating same.

Any suitable form of locking means may be provided for retaining the swinging latch means 10 in locking position. However, we prefer to use the toggle form of latch-retaining means illustrated in the drawings, which means may include a release lever 31 suitably mounted upon the transverse shaft 32 journaled in bearings 33, which bearings are mounted upon the rear frame standards 34. Each end of shaft 32 is provided with a crank arm 35 and each crank arm is pivotally connected to the upper end of one of the swinging latch means 10 by means of a toggle link 36. In order to form a toggle lock between the crank arms 35 and the toggle links 36, the standards 34 are provided with stop brackets 37 positioned to permit the crank arms to rise slightly above the plane of the center line passing through the center of shaft 32 and the pivotal connection between the toggle link and the latch means, whereby any tendency of the swinging latch means to rotate due to the thrust thereagainst by the bowl stops, will act to move the toggle links rearwardly and force the crank arms more securely against the stop brackets 37.

By this toggle locking arrangement, the latch means are securely retained in locking position. However, this toggle locking arrangement may be easily disrupted by actuating the release lever 31 to rotate the crank arms until their outer ends swing below the plane of the center line above referred to. As soon as the toggle locking arrangement is disrupted, the swinging latch means are free and are immediately swung by the force of the bowl stops to unlock the bowl. From the above, it will be observed that the bowl locking means are self-unlocking once the toggle locking arrangement is disrupted. It is desirable to return the swinging latch means into locking position and to re-establish the toggle locking arrangement as soon as the bowl stops have been released, and for that purpose there is provided a spring means 38 acting between the release lever 31 and a bracket 39 carried by one of the brace members 17.

The scraper is operated by coupling a tractor to the forward end thereof and then connecting the usual fluid pressure hoses to each end of the hydraulic cylinder 20. Pressure is supplied to the cylinder to elevate and simultaneously tilt or rotate the bowl into carrying position, and the scraper is then drawn to the loading locality where pressure is again supplied to the cylinder to lower the bowl and simultaneously tilt the cutting edge into loading position.

As the implement is moved forward, the cutting edge of the bowl engages the ground and the load is accumulated, whereupon the hydraulic cylinder is again supplied with pressure fluid to articulate the frames by lifting the forward end of the rear frame to elevate the scraper bowl into carrying position.

As the latch means are mounted upon the front ends of the rear frame, the bowl is automatically tilted or rotated in a counterclockwise direction, as viewed in Figs. 2 and 5, during this elevating operation, whereby practically all of the load accumulated therein will be retained. With the tilting of the bowl the cutting edge thereof may be raised above the horizontal plane so that when a levee or embankment is encountered, the bowl will slide or float over the levee or embankment instead of cutting a path therethrough. Our hydraulic wheel scraper may be used for building up levees, breaks or embankments, because it will ride up onto the top of the levee where the accumulated load may be dumped. When it is desired to dump the load, the operator actuates lever 31 by pulling upon rope 40 to disrupt the toggle locking means, whereupon the latch means are swung out of engagement with the bowl stops by the thrust exerted thereby. If the load is to be thinly spread, the lever 31 is immediately released to permit the latch means and toggle arrangement to be returned to their locking positions to engage the spreading stops 7, but if the load is to be left in a pile, the lever 31 is held in releasing position until the stops 7 have passed by the latch means 10. After dumping the load, the scraper is drawn back to the loading locality, where the loading operation is repeated.

With the applicants' invention, when the bowl is elevated, the weight of the load is transferred to the traction wheels, whereby only a light draft is required to move the implement, and therefore faster trips can be made, and as the bowl is rearwardly tilted during the elevating operation, very little of the accumulated load will spill out; also, due to the rearward tilting of the bowl, the load will not be shaken out of the bowl while the implement is being drawn to the dumping location.

Having fully described the invention, it is to be understood that it is not to be limited to the details herein set forth but the invention is of the full scope of the appended claims.

We claim:

1. A hydraulic scraper, including a front frame, a scraper bowl pivotally mounted in said frame and having stop brackets, a rear frame pivotally connected to said front frame, traction wheels journaled upon the rear end of said rear frame, a movable latch means operatively mounted upon the forward end of said rear frame and positioned to engage said bowl stop brackets, and an elevating means including a hydraulic cylinder mounted upon said front frame and operatively connected to the forward end of said rear frame for simultaneously elevating and rearwardly tilting the scraper bowl, whereby the accumulated load is retained within the bowl and the weight thereof carried by said wheels.

2. In a hydraulic scraper, a front frame, a scraper bowl pivotally mounted in said frame and having stop brackets, a rear frame pivotally connected to said front frame, traction wheels journaled upon the rear end of said rear frame, a movable latch means operatively mounted upon the forward end of said rear frame and positioned to engage said bowl stop brackets, an elevating means including a hydraulic cylinder mounted upon said front frame and operatively connected to the forward end of said rear frame, and means for actuating said movable latch means out of engagement with said bowl stop brackets.

3. In a hydraulic scraper, a front frame, a rear frame pivotally connected to said front frame, a scraper bowl pivotally mounted in said front and rear frames upon the pivots connecting said frames and having adjustable stop brackets, traction wheels journaled upon the rear end of said rear frame, a movable latch means operatively mounted upon the forward end of said rear frame and positioned to engage said bowl stop brackets, an elevating means including a hydraulic cylinder mounted upon said front frame and operatively connected to the forward end of said rear frame for simultaneously elevating and rearwardly tilting the scraper bowl.

4. In a hydraulic scraper, a front frame, a rear frame pivotally connected thereto, a scraper bowl pivotally mounted in said front and rear frames upon the pivots connecting said frames and having adjustable stop brackets, traction wheels journaled upon the rear end of said rear frame, a movable latch means operatively mounted upon the forward end of said rear frame and positioned to engage said bowl stop brackets, an elevating means including a hydraulic cylinder mounted upon said front frame and operatively connected to the forward end of said rear frame for simultaneously elevating and rearwardly tilting the scraper bowl, and means for actuating said movable latch means out of engagement with said bowl stop brackets.

5. In a hydraulic scraper, a front frame, a rear frame, means for pivotally connecting said frames, a scraper bowl pivotally mounted upon said pivotal connecting means, a plurality of stop means mounted upon each end of said bowl, a swinging latch means operatively mounted upon the forward end of said rear frame and positioned to engage said stop means, traction wheels journaled upon the rear end of said rear frame, an elevating means including a hydraulic cylinder mounted upon said front frame and operatively connected to the forward end of said rear frame for simultaneously elevating and rearwardly tilting the scraper bowl, means for retaining said swinging latch means in locking engagement with said bowl stops, and means for releasing said retaining means for disengaging said latching means from said bowl stops.

6. In a scraper, a front frame, a rear frame, means for pivotally connecting said frames, a scraper bowl pivotally mounted upon said rear frame, a plurality of stop means mounted upon the bowl, a swinging latch means operatively mounted upon the forward end of said rear frame and positioned to engage said stop means, traction wheels journaled upon the rear end of said rear frame, an elevating means mounted upon the front frame and operatively connected to the forward end of said rear frame for simultaneously elevating and rearwardly tilting the scraper bowl, means including toggle locks for retaining said latch means in locking engagement with said bowl stops, and means for disrupting said toggle locks.

Signed at Los Angeles, Calif., this 5th day of July, 1932.

OSCAR W. SJOGREN.
JESSE A. VAUGHN.